US012577426B2

(12) United States Patent
Mekhilef et al.

(10) Patent No.: US 12,577,426 B2
(45) Date of Patent: Mar. 17, 2026

(54) POLYMER COMPOSITION AND METHODS OF MAKING AND USING THE SAME

(71) Applicant: SAINT-GOBAIN PERFORMANCE PLASTICS CORPORATION, Solon, OH (US)

(72) Inventors: Nafih Mekhilef, Shrewsbury, MA (US); Boguslawa C. Czarnecka, Northborough, MA (US)

(73) Assignee: SAINT-GOBAIN PERFORMANCE PLASTICS CORPORATION, Malvern, PA (US)

( * ) Notice: Subject to any disclaimer, the term of this patent is extended or adjusted under 35 U.S.C. 154(b) by 571 days.

(21) Appl. No.: 18/063,842

(22) Filed: Dec. 9, 2022

(65) Prior Publication Data

US 2023/0183514 A1 Jun. 15, 2023

Related U.S. Application Data

(60) Provisional application No. 63/265,239, filed on Dec. 10, 2021.

(51) Int. Cl.
| | |
|---|---|
| *C09D 127/18* | (2006.01) |
| *C08K 3/04* | (2006.01) |
| *C08L 27/18* | (2006.01) |
| *C09D 7/61* | (2018.01) |

(52) U.S. Cl.
CPC ............... *C09D 127/18* (2013.01); *C08K 3/04* (2013.01); *C08L 27/18* (2013.01); *C09D 7/61* (2018.01)

(58) Field of Classification Search
CPC .......... C09D 127/18; C09D 7/61; C08K 3/04; C08L 27/18
See application file for complete search history.

(56) References Cited

U.S. PATENT DOCUMENTS

| | | | |
|---|---|---|---|
| 3,944,536 | A | 3/1976 | Lupton et al. |
| 4,624,990 | A | 11/1986 | Lunk et al. |
| 7,709,566 | B2 | 5/2010 | Hoshikawa et al. |
| 7,863,410 | B2 | 1/2011 | Smith et al. |
| 8,231,974 | B2 | 7/2012 | Nishio |
| 8,329,839 | B2 | 12/2012 | Smith et al. |
| 9,051,461 | B2 | 6/2015 | Harvey et al. |
| 9,790,358 | B2 | 10/2017 | Harvey et al. |
| 10,265,661 | B2 | 4/2019 | Chaen et al. |

(Continued)

FOREIGN PATENT DOCUMENTS

| | | |
|---|---|---|
| DE | 19619232 A1 | 11/1997 |
| EP | 0418155 A2 | 3/1991 |

(Continued)

OTHER PUBLICATIONS

Sawai et al. Journal of Polymer Science: Part B: Polymer Physics, vol. 44, 3369-3377 (2006).*

(Continued)

*Primary Examiner* — Shane Fang
(74) *Attorney, Agent, or Firm* — Abel Schillinger, LLP; Ann Palma

(57) ABSTRACT

A polymer composition including a fluoropolymer composition including greater than 99 wt % polytetrafluoroethylene, where the fluoropolymer composition exhibits a melting temperature of greater than 327° C. at a pressure of 0.1 MPa.

19 Claims, 4 Drawing Sheets

(56) References Cited

U.S. PATENT DOCUMENTS

| | | | |
|---|---|---|---|
| 2004/0048958 A1 | 3/2004 | Didier | |
| 2005/0137371 A1 | 6/2005 | Smith et al. | |
| 2015/0337098 A1* | 11/2015 | Hayashi | B01D 69/02 |
| | | | 264/41 |
| 2019/0039290 A1* | 2/2019 | Lebrun | B29C 71/02 |
| 2021/0155821 A1* | 5/2021 | Jing | C09D 127/18 |

FOREIGN PATENT DOCUMENTS

| | | | |
|---|---|---|---|
| EP | 2291452 B1 | 1/2018 | |
| KR | 20210068495 A | 6/2021 | |
| WO | 2003078481 A1 | 9/2003 | |
| WO | 2005003189 A1 | 1/2005 | |

OTHER PUBLICATIONS

Expanded PTFE Applications Handbook: Technology, Manufacturing and Applications Sina Ebnesajjad, pp. 11, 50, 83, 117.

Glaris, Patrice et al., "Thermal annealing as a new simple method for PTFE texturing", Polymer, Aug. 11, 2013 (Online publication date), vol. 54, pp. 5858-5864.

Christakopoulos, Fotis et al., "Melting kinetics of nascent poly(tetrafluoroethylene) powder", Polymers, Apr. 2, 2020 (Publication date), vol. 12, Article No. 791, Internal pp. 1-18.

Conte M. et al, "Effect of surface temperature on tribological behavior of PTFE composites", In Book: Composites: Advances in Manufacturing and Characterization, Jan. 1, 2015, pp. 187-198.

* cited by examiner

POLYMER COMPOSITION AND METHODS OF MAKING AND USING THE SAME

CROSS-REFERENCE TO RELATED APPLICATION(S)

This application claims priority under 35 U.S.C. § 119(e) to U.S. Provisional Application No. 63/265,239, entitled "POLYMER COMPOSITION AND METHODS OF MAKING AND USING THE SAME," by Nafih MEKHILEF et al., filed Dec. 10, 2021, which is assigned to the current assignee hereof and incorporated herein by reference in its entirety.

FIELD OF THE DISCLOSURE

The disclosure relates to a polymer composition comprising a fluoropolymer composition and methods of making and using the same.

BACKGROUND

Fluoropolymers such as polytetrafluoroethylene (PTFE) are commonly used in wide ranging applications due to its unique properties. Commonly, polytetrafluoroethylene is used because it exhibits unique properties such as mechanical strength, temperature resistance (up to 260° C.), low friction, and chemical inertness. However, the lower melting point of polytetrafluoroethylene limits its uses as it may not be easily manufactured and formed under reproducible conditions. Therefore, there exists a need to have fluoropolymers that can be produced to form parts requiring higher melting points for ease of manufacturing and use in wide ranging applications.

BRIEF DESCRIPTION OF THE DRAWINGS

The present disclosure may be better understood, and its numerous features and advantages made apparent to those skilled in the art by referencing the accompanying drawings.

FIG. 2A illustrates a cylindrical bearing made from the polymer composition that can be formed by rolling;

FIG. 2B illustrates a flanged bearing made from the polymer composition that can be formed by rolling and flanging;

FIG. 2C illustrates a flanged bearing made from the polymer composition having a tapered cylindrical portion that can be formed by rolling a tapered portion and flanging an end;

FIG. 2D illustrates a flanged bearing made from the polymer composition mounted in a housing with a shaft pin mounted through the flanged bearing;

FIG. 2E illustrates a two-sided flanged bearing made from the polymer composition mounted in a housing with a shaft pin mounted through the two-sided flanged bearing;

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention. The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single embodiment is described herein, more than one embodiment may be used in place of a single embodiment. Similarly, where more than one embodiment is described herein, a single embodiment may be substituted for that more than one embodiment.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the polymer and polymer composition arts.

Figure 1A:
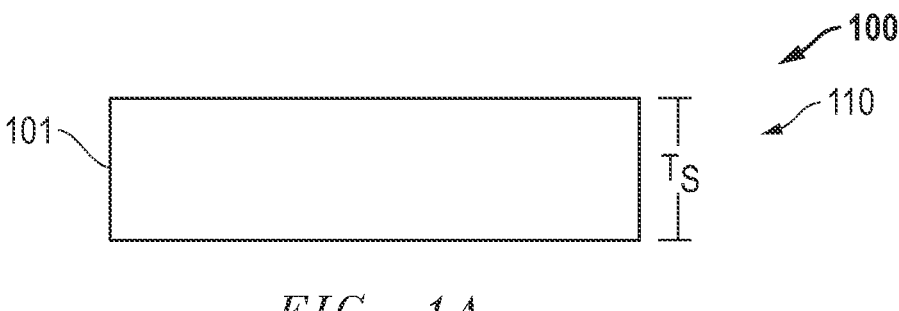
FIG. 1A illustrates an exemplary polymer composition in cross-sectional view.
Figure 1B:
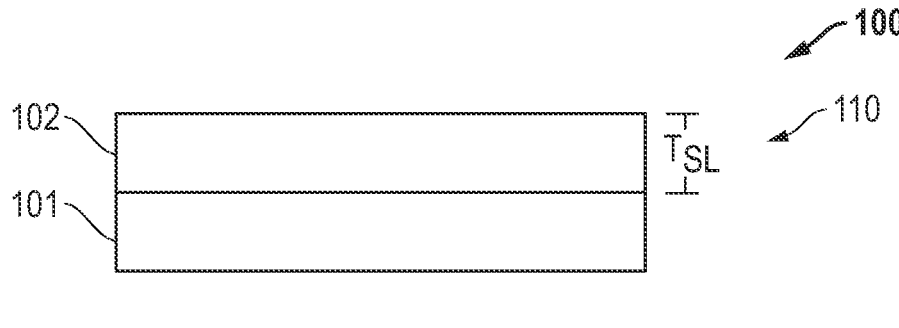
FIG. 1B illustrates an exemplary polymer composition in cross-sectional view.
Figure 1C:
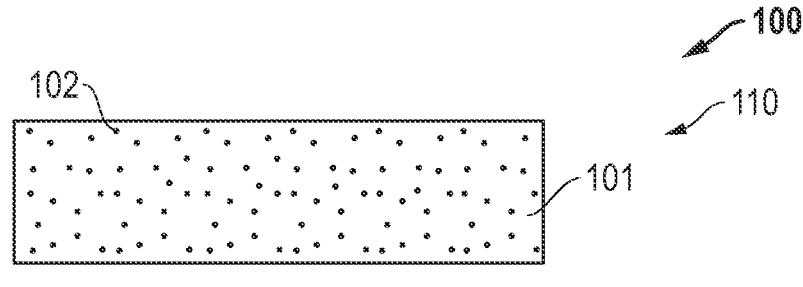
FIG. 1C illustrates an exemplary polymer composition in cross-sectional view.

The structure of an exemplary polymer composition 100 is shown in FIGS. 1A-1C. As shown in FIG. 1A, the polymer composition 100 may include a fluoropolymer composition denoted by 101. As shown in FIG. 1B, optionally, the polymer composition 100 may further include a filler 102. In an embodiment, the fluoropolymer composition 101 is provided and the filler 102 may be applied to the fluoropolymer composition 101 such that it is overlying the fluoropolymer composition 101. In an embodiment, the filler 102 may be applied to the fluoropolymer composition 101 such that it is overlying and in direct contact with the fluoropolymer composition 101. In an embodiment, the filler 102 may be applied to the fluoropolymer composition 101 such that it is overlying the fluoropolymer composition 101 with intervening layers therebetween. In an embodiment, as shown in FIG. 1C, the filler 102 may be applied to the fluoropolymer composition 101 such that it may be enveloped or embedded in the fluoropolymer composition 101 to form a polymer composition 100. It is contemplated herein that the polymer composition 100 may include additional layers and compositions.

In a number of embodiments, the polymer composition 100 can include a fluoropolymer composition 101. In an embodiment, the fluoropolymer composition 101 can include a polymer, including at least one of polytetrafluoroethylene (including modified and unmodified polytetrafluoroethylene), perfluoroalkoxy alkane, fluorinated ethylene propylene, polyether ether ketone, or ultra-high-molecular-weight polyethylene An example fluoropolymer includes fluorinated ethylene propylene (FEP), polytetrafluoroethylene (PTFE), polyvinylidene fluoride (PVDF), perfluoroalkoxy (PFA), polyoxymethylene (POM), polyphenylsulfide (PPS), polyetheretherimide (PEI), or a polyimide (PI), an aromatic polyester, a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE). The fluoropolymer composition 101 can be of any structure or shape. In embodiments, the fluoropolymer composition 101 can be a plate, a sheet, a woven fabric, a mesh, or a foam. In an embodiment, the fluoropolymer composition may be a woven polymer mesh.

In a number of embodiments, fluoropolymer composition 101 (or polymer composition 100) may comprise or consist entirely of polytetrafluoroethylene. The fluoropolymer composition 101 may include polytetrafluoroethylene in a wt % of at least 50%, such as at least 60%, such as at least 70%, such as at least 80%, such as at least 90%, such as at least 95%, such as at least 97%, such as at least 99%, or such as at least 99.5%. In an embodiment, the fluoropolymer composition 101 (or polymer composition 100) may comprise or consist entirely of polytetrafluoroethylene in powder form.

In a number of embodiments, the fluoropolymer composition 101 (or polymer composition 100) may exhibit a melting temperature greater than 320° C. at ambient pressure (e.g. 0.1 MPa), such as greater than 321° C. at 0.1 MPa, greater than 322° C. at 0.1 MPa, greater than 323° C. at 0.1 MPa, greater than 324° C. at 0.1 MPa, greater than 325° C. at 0.1 MPa, greater than 326° C. at 0.1 MPa, greater than 327° C. at 0.1 MPa, greater than 328° C. at 0.1 MPa, greater than 329° C. at 0.1 MPa, greater than 330° C. at 0.1 MPa, greater than 331° C. at 0.1 MPa, greater than 332° C. at 0.1 MPa, greater than 333° C. at 0.1 MPa, greater than 334° C. at 0.1 MPa, greater than 335° C. at 0.1 MPa, greater than 336° C. at 0.1 MPa, greater than 337° C. at 0.1 MPa, greater than 338° C. at 0.1 MPa, greater than 339° C. at 0.1 MPa, greater than 340° C. at 0.1 MPa, greater than 341° C. at 0.1 MPa, greater than 342° C. at 0.1 MPa, greater than 343° C. at 0.1 MPa, greater than 344° C. at 0.1 MPa, or greater than 345° C. at 0.1 MPa.

In an embodiment, the fluoropolymer composition 101 (or polymer composition 100) may have a temperature of crystallization of greater than 250° C. at ambient pressure (e.g. 0.1 MPa), such as greater than 275° C. at 0.1 MPa, such as greater than 300° C. at 0.1 MPa, such as greater than 325° C. at 0.1 MPa, or such as greater than 330° C. at 0.1 MPa.

In an embodiment, the fluoropolymer composition 101 (or polymer composition 100) may have a temperature of crystallization of less than 375° C. at 0.1 MPa, such as less than 350° C. at 0.1 MPa, such as less than 325° C. at 0.1 MPa, such as less than 300° C. at 0.1 MPa, such as less than 275° C. at 0.1 MPa, or such as less than 250° C. at 0.1 MPa. In a number of embodiments, the fluoropolymer composition 101 (or polymer composition 100) may have a temperature of crystallization of between 300° C. and 325° C. at 0.1 MPa.

In a number of embodiments, the fluoropolymer composition 101 (or polymer composition 100) may exhibit a crystallinity of greater than 95% for polytetrafluoroethylene, such as greater than 97%, such as greater than 99%, or such as greater than 99.5%. In a number of embodiments, the fluoropolymer composition 101 (or polymer composition 100) may exhibit a crystallinity of less than 99% for polytetrafluoroethylene, such as less than 97%, such as less than 95%, or such as less than 93.5%.

In a number of embodiments, the fluoropolymer composition 101 (or polymer composition 100) may exhibit a crystallinity of greater than 95% in planar zig-zag crystal III in the phase diagram for polytetrafluoroethylene, such as greater than 97%, such as greater than 99%, or such as greater than 99.5%. In a number of embodiments, the fluoropolymer composition 101 (or polymer composition 100) may exhibit a crystallinity of less than 99% in planar zig-zag crystal III in the phase diagram for polytetrafluoroethylene, such as less than 97%, such as less than 95%, or such as less than 93.5%.

In an embodiment, the fluoropolymer composition 101 (or polymer composition 100) may have a density of at least 1.5 g/cc at ambient temperature and pressure (e.g. 25° C., 0.1 MPa), such as at least 1.75 g/cc, such as at least 2 g/cc, such as at least 2.25 g/cc, or such as at least 2.5 g/cc. In an embodiment, the fluoropolymer composition 101 (or polymer composition 100) may have a density of at least 1.5 g/cc at ambient temperature and pressure (e.g. 25° C., 0.1 MPa), such as less than 5 g/cc, such as less than 4 g/cc, such as less than 3 g/cc, such as less than 2.5 g/cc, or such as less than 2.3 g/cc. In a number of embodiments, the fluoropolymer composition 101 (or polymer composition 100) may have density of between 2.15 and 2.3 g/cc at ambient temperature and pressure.

In an embodiment, the fluoropolymer composition 101 (or polymer composition 100) may have an enthalpy of melting $\Delta H_m$ of at least 15 J/g at ambient temperature and pressure (e.g. 25° C., 0.1 MPa), such as at least 20 J/g, such as at least 25 J/g, such as at least 30 J/g, or such as at least 40 J/g. In an embodiment, the fluoropolymer composition 101 (or polymer composition 100) may have an enthalpy of melting $\Delta H_m$ of less than 100 J/g at ambient temperature and pressure (e.g. 25° C., 0.1 MPa), such as less than 80 J/g, such as less than 70 J/g, such as less than 60 J/g, such as less than 50 J/g, or such as less than 40 J/g. In a number of embodiments, the fluoropolymer composition 101 (or polymer composition 100) may have an enthalpy of melting $\Delta H_m$ of between 30 and 70 J/g at ambient temperature and pressure.

In an embodiment, the fluoropolymer composition 101 (or polymer composition 100) may have an enthalpy of crystallization $\Delta H_C$ of at least 10 J/g at ambient temperature and pressure (e.g. 25° C., 0.1 MPa), such as at least 15 J/g, such as at least 20 J/g, such as at least 25 J/g, or such as at least 30 J/g. In an embodiment, the fluoropolymer composition 101 (or polymer composition 100) may have an enthalpy of crystallization $\Delta H_C$ of less than 50 J/g at ambient temperature and pressure (e.g. 25° C., 0.1 MPa), such as less than 40

J/g, such as less than 30 J/g, such as less than 20 J/g, such as less than 15 J/g, or such as less than 10 J/g. In a number of embodiments, the fluoropolymer composition 101 (or polymer composition 100) may have an enthalpy of crystallization $\Delta H_C$ of between 20 and 35 J/g at ambient temperature and pressure.

In a number of embodiments, the polymer composition 100 can include a filler 102. The filler 102 can include a polymer, such as a polyketone, a polyaramid, a polyimide, a polytherimide, a polyphenylene sulfide, a polyetherslfone, a polysulfone, a polypheylene sulfone, a polyamideimide, ultra high molecular weight polyethylene, a fluoroploymer, a polyamide, a polybenzimidazole, or any combination thereof. In an example, the filler 102 includes a polyketone, a polyaramid, a polyimide, a polyetherimide, a polyamide-imide, a polyphenylene sulfide, a polyphenylene sulfone, a fluoropolymer, a polybenzimidazole, a derivative thereof, or a combination thereof. In a particular example, the filler 102 includes a polymer, such as a polyketone, a thermoplastic polyimide, a polyetherimide, a polyphenylene sulfide, a polyether sulfone, a polysulfone, a polyamideimide, a derivative thereof, or a combination thereof. In a further example, the filler 102 includes polyketone, such as polyether ether ketone (PEEK), polyether ketone, polyether ketone ketone, polyether ketone ether ketone, a derivative thereof, or a combination thereof. In an additional example, the filler 102 may be an ultra high molecular weight polyethylene. An example fluoropolymer includes fluorinated ethylene propylene (FEP), polytetrafluoroethylene (PTFE), polyvinylidene fluoride (PVDF), perfluoroalkoxy (PFA), polyoxymethylene (POM), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE). Further, the filler 102 could include polyacetal, polybutylene terephthalate (PBT), polyethylene terephthalate (PET), polyimide (PI), polyetherimide, polyetheretherketone (PEEK), polyethylene (PE), polysulfone, polyamide (PA), polyphenylene oxide, polyphenylene sulfide (PPS), polyurethane, polyester, liquid crystal polymers (LCP), or any combination thereof. The filler 102 may include a solid based material including lithium soap, graphite, boron nitride, molybdenum disulfide, tungsten disulfide, polytetrafluoroethylene, carbon nitride, tungsten carbide, or diamond like carbon, a metal (such as aluminum, zinc, copper, magnesium, tin, platinum, titanium, tungsten, iron, bronze, steel, spring steel, stainless steel), a metal alloy (including the metals listed), an anodized metal (including the metals listed) or any combination thereof. Fluoropolymers may be used according to particular embodiments.

To improve the mechanical and general physical properties of the polymer composition, the filler 102 can contain fillers, pigments and/or dyes. Filler 102 can increase and/or improve the thermal conductivity and/or the wear properties. The filler 102 can be fibers, inorganic materials, thermoplastic materials, mineral materials, or mixtures thereof. For example, fibers can include organic materials, such as glass fibers, carbon fibers, and aramids. Inorganic materials can include ceramic materials, carbon, glass, graphite, aluminium oxide, molybdenum sulfide, bronze, and silicon carbide. The inorganic materials can be in the form of woven fabrics, powders, spheres or fibers. Examples of thermoplastic materials can include polyimide (PI), polyamidimide (PAI), polyphenylene sulfide (PPS), polyoxymethylene (POM), polyphenylene sulfone (PPSO2), liquid crystal polymers (LCP), polyether ether ketones (PEEK), polyether-sulfone (PES), polyetherketone (PEK), and aromatic polyesters (Ekonol), or mixtures thereof. In an embodiment, the filler 102 can include a fluoropolymer, such as any of the fluoropolymers listed above. The filler 102 may be a different fluoropolymer than the above mentioned fluoropolymer in the fluoropolymer composition 101. Example of mineral materials can include wollastonite, diatomaceous earth, carbon black, and barium sulfate. Filler 102 can be organic or inorganic platelet material. Filler 102 can be in the form of beads, fibers, powder, mesh, or any combination thereof.

The filler 102 can be present in the polymer composition 100 in an amount of at least about 1 vol %, at least about 5 vol %, at least about 10 vol %, at least about 15 vol %, at least about 20 vol %, at least about 25 vol %, at least about 30 vol %, at least about 35 vol %, at least about 40 vol %, at least about 50 vol %, at least about 60 vol %, at least about 70 vol %, at least about 80 vol %, or at least about 90 vol % based on the total volume of the polymer composition 110.

The filler 102 can be present in the polymer composition 100 in an amount of at least about 1 wt %, at least about 5 wt %, at least about 10 wt %, at least about 15 wt %, at least about 20 wt %, at least about 25 wt %, at least about 30 wt %, at least about 35 wt %, at least about 40 wt %, at least about 50 wt %, at least about 60 wt %, at least about 70 wt %, at least about 80 wt %, or at least about 90 wt % based on the total weight of the polymer composition 110.

In one embodiment, the filler 102 may be in the form of particles in the continuous phase. The particles have a primary aspect ratio of at least about 2:1, at least about 3:1, at least about 4:1, or at least about 5:1. The primary aspect ratio means the ratio of the longest dimension over the second longest dimension, wherein the two dimensions are in orthogonal relation to each other.

In yet another embodiment, the filler particles have a secondary aspect ratio of at least about 1:1, at least about 2:1, at least about 3:1, or at least about 4:1. The secondary aspect ratio means the ratio of the second longest dimension over the third longest dimension, wherein the two dimensions are in orthogonal relation to each other.

In one further embodiment, at least 50 percent of the filler particles have a primary dimension not greater than about 30 microns, not greater than about 25 microns, not greater than about 20 microns, not greater than about 18 microns, not greater than about 15 microns, not greater than about 13 microns, or even not greater than about 10 microns.

In yet another embodiment, at least 50 percent of the filler particles have a secondary dimension not greater than about 20 microns, not greater than about 18 microns, not greater than about 15 microns, not greater than about 13 microns, not greater than about 10 microns, not greater than about 8 microns, not greater than about 5 microns, or not greater than about 3 microns.

In even one further embodiment, at least 50 percent of the filler particles have a tertiary dimension not greater than about 20 microns, not greater than about 18 microns, not greater than about 15 microns, not greater than about 13 microns, not greater than about 10 microns, not greater than about 8 microns, not greater than about 5 microns, not greater than about 3 microns.

In one particular embodiment, the filler particles have an inhomogeneous distribution in size throughout the filler. An inhomogeneous size distribution in a filler is established when there is a gradient of the primary dimension from the center of the filler to the edges of the filler. For example, in one embodiment, the particles in the center region, e.g., within 50 microns of the centerline of the filler, can have an average droplet size larger than the particles in the edge region, i.e. within 50 microns of the surface or edge of the filler. In one example, the average droplet size in the center region can be 7 microns gradually decreasing to an average droplet size in the edge region of 1 micron.

In an embodiment, the filler 102 can have a thickness $T_{SL}$ of at least about 0.05 mm, such as at least about 0.1 mm, at least about 0.15 mm, at least about 0.2 mm, at least about 0.25 mm, at least about 0.3 mm, at least about 0.35 mm, at least about 0.4 mm, or at least about 0.45 mm. In an embodiment, the filler 102 can have a thickness $T_{SL}$ of not greater than about 5 mm, not greater than about 4 mm, not greater than about 3 mm, not greater than about 2.5 mm, not greater than about 2 mm, such as not greater than about 1.5 mm, not greater than about 1 mm, not greater than about 0.9 mm, not greater than about 0.8 mm, not greater than about 0.7 mm, not greater than about 0.6 mm, not greater than about 0.55 mm, or not greater than about 0.5 mm. It will be further appreciated that the thickness $T_{SL}$ of the filler 102 may be any value between any of the minimum and maximum values noted above. The thickness of the filler 102 may be uniform, i.e., a thickness at a first location of the filler 102 can be equal to a thickness at a second location therealong. The thickness of the filler 102 may be non-uniform, i.e., a thickness at a first location of the filler 102 can be different from a thickness at a second location therealong. It can be appreciated that different filler 102 may have different thicknesses. The filler 102 may overlie one major surface of the fluoropolymer composition 101, shown, or overlie both major surfaces. The fluoropolymer composition 101 may be at least partially encapsulated by the filler 102. That is, the filler 102 may cover at least a portion of the fluoropolymer composition 102. Axial surfaces of the fluoropolymer composition 102 may be exposed from the filler 102.

In an embodiment, the filler 102 may include an adhesive. The adhesive may include any known adhesive material common to the bearing arts including, but not limited to, fluoropolymers, epoxy resins, polyimide resins, polyether/ polyamide copolymers, ethylene vinyl acetates, ethylene tetrafluoroethylene (ETFE), ETFE copolymer, perfluoro-alkoxy (PFA), or any combination thereof. Additionally, the adhesive can include at least one functional group selected from —C═O, —C—O—R, —COH, —COOH, —COOR, —CF$_2$═CF—OR, or any combination thereof, where R is a cyclic or linear organic group containing between 1 and 20 carbon atoms. Additionally, the adhesive can include a copolymer. In an embodiment, the hot melt adhesive can have a melting temperature of not greater than 250° C., such as not greater than 220° C. In another embodiment, the adhesive may break down above 200° C., such as above 220° C. In further embodiments, the melting temperature of the hot melt adhesive can be higher than 250° C. or even higher than 300° C. In an embodiment, the hot melt adhesive can have a melting temperature of not greater than 250° C., such as not greater than 220° C. In another embodiment, the adhesive may break down above 200° C., such as above 220° C. In further embodiments, the melting temperature of the hot melt adhesive can be higher than 250° C. or even higher than 300° C.

In one process, both the fluoropolymer composition and the filler are in each case rolled off a roll as continuous material. Adhesive polymer may be applied to the fluoropolymer composition and the layers may be joined to one another under pressure and at elevated temperature in a laminating apparatus. To achieve further-improved adhesion of the adhesive layer to the fluoropolymer composition together with improved corrosion properties of the fluoropolymer composition, an embodiment of the process provides for the surface of the fluoropolymer composition to be roughed and/or surface-upgraded.

In an embodiment, any of the layers on the polymer composition 100, as described above, can each be disposed in a roll and peeled therefrom to join together under pressure, at elevated temperatures (hot or cold pressed or rolled), by an adhesive, or by any combination thereof. Any of the layers of the polymer composition 100, as described above, may be laminated together such that they at least partially overlap one another. Any of the layers on the polymer composition 100, as described above, may be applied together using coating technique, such as, for example, physical or vapor deposition, spraying, plating, powder coating, or through other chemical or electrochemical techniques. In a particular embodiment, the filler 102 may be applied by a roll-to-roll coating process, including for example, extrusion coating. The filler 102 may be heated to a molten or semi-molten state and extruded through a slot die onto a major surface of the fluoropolymer composition 101. In another embodiment, the filler 102 may be cast or molded.

In an embodiment, the filler 102 or any layers can be glued to the fluoropolymer composition 101 using the adhesive to form a laminate. In an embodiment, any of the intervening or outstanding layers on the material or polymer composition 100, may form the laminate. The laminate can be cut into strips or blanks that can be formed into the bearing. The cutting of the laminate may include use of a stamp, press, punch, saw, or may be machined in a different way. Cutting the laminate can create cut edges including an exposed portion of the fluoropolymer composition 101.

In other embodiments, any of the layers on the polymer composition 100, as described above, may be applied by a coating technique, such as, for example, physical or vapor deposition, spraying, plating, powder coating, or through other chemical or electrochemical techniques. In a particular embodiment, the filler 102 may be applied by a roll-to-roll coating process, including for example, extrusion coating. The filler 102 may be heated to a molten or semi-molten state and extruded through a slot die onto a major surface of the fluoropolymer composition 101. In another embodiment, the filler 102 may be cast or molded.

In even one further embodiment, the polymer composition 100 can have a surface of a varying nature. The polymer composition 100 can have either a smooth surface, a roughened, or structured surface (for example, as achieved by brushing, sandblasting, embossing of a structure). For example, surface roughness of the polymer composition 100 can be at least about 0.01 micron, at least about 0.02 micron, at least about 0.05 micron, at least about 0.1 micron, at least about 0.5 micron, at least about 1 micron, at least about 2 microns, at least about 5 microns, at least about 10 microns, at least about 20 microns, at least about 50 microns, at least about 100 microns, at least about 200 microns, or at least about 400 microns. In another embodiment, the surface roughness can be less than about 400 microns, less than about 200 microns, less than about 100 microns, less than about 50 microns, less than about 25 microns, less than about 20 microns, less than about 15 microns, less than about 10 microns, less than about 5 microns, less than about 3 microns, less than about 2 microns, or even less than about 1 micron. In yet another embodiment, the fluoropolymer composition can have a surface roughness in the range from about 0.1 micron to about 400 microns, from about 0.5 micron to about 100 microns, or from about 1 micron to about 50 microns. The surface of the polymer composition

100 can be treated by plating or coating to roughen, upgrade, or coat the surface. In another embodiment, the surface area of the polymer composition 100 can be increased by mechanical structuring. The structuring can include brush-finishing, sand-blasting, etching, perforating, pickling, punching, pressing, curling, deep drawing, decambering, incremental sheet forming, ironing, laser cutting, rolling, hammering, embossing, undercutting, and any combinations thereof. For example, embossing of a structure allows for the possibility of intermeshing, which has a positive effect on the resulting bonding forces.

The polymer composition 100 can have a thickness Ts of at least about 0.05 mm, such as at least about 0.1 mm, at least about 0.15 mm, at least about 0.2 mm, at least about 0.25 mm, at least about 0.3 mm, at least about 0.35 mm, at least about 0.4 mm, or at least about 0.45 mm. The polymer composition 100 can have a thickness Ts of not greater than about 5 mm, not greater than about 4 mm, not greater than about 3 mm, not greater than about 2.5 mm, not greater than about 2 mm, not greater than about 1.5 mm, not greater than about 1 mm, not greater than about 0.9 mm, not greater than about 0.8 mm, not greater than about 0.7 mm, not greater than about 0.6 mm, not greater than about 0.55 mm, or not greater than about 0.5 mm. It will be further appreciated that the thickness Ts of the polymer composition 100 may be any value between any of the minimum and maximum values noted above. The thickness of the polymer composition 100 may be uniform, i.e., a thickness at a first location of the polymer composition 100 can be equal to a thickness at a second location therealong. The thickness of the polymer composition 100 may be non-uniform, i.e., a thickness at a first location of the polymer composition 100 can be different from a thickness at a second location therealong.

In a number of embodiments, the polymer composition 100 may be formed via a method. The method may include providing a fluoropolymer composition comprising greater than 99 wt % polytetrafluoroethylene. The fluoropolymer composition may be provided as a stock polymer powder. The method may further include heating the fluoropolymer composition to a range from 320° C. to 370° C. while pressurizing the fluoropolymer composition to a range from 60 MPa to 100 MPa. The method may further include annealing the fluoropolymer composition to range from 330° C. to 150° C. while pressurizing the fluoropolymer composition to a range from 100 MPa to 1 MPa at a rate of between 2° C. and 10° C./min to form a polymer composition exhibiting a melting temperature of greater than 327° C. at a pressure of 0.1 MPa. The heating step of the method may further include heating through a molding operation. The polymer composition may then be formed into parts through the molding operation. The molding operation can include injection molding.

According to certain embodiments, the polymer composition 100 may be formed into a bearing. In these embodiments, the polymer composition 100 may be applied as a coating onto a substrate. The substrate may include a metal. The metal may include aluminum, zinc, copper, magnesium, tin, platinum, titanium, tungsten, iron, bronze, steel, spring steel, stainless steel), a metal alloy (including the metals listed), an anodized metal (including the metals listed) or any combination thereof. Forming the polymer composition 100 into a bearing may include a cutting operation to cut a blank of polymer composition 100, then forming the blank into a finished or semi-finished bearing. Bearings can include plane bearings, annular bearings, balljoint bearings (half spheres), plain bearings, axial bearings, thrust bearings, linear bearings, bearing shells, bearing cups and combinations thereof. In an embodiment, the cutting operation may include use of a stamp, press, punch, saw, deep draw, or may be machined in a different way. After shaping the bearing, the bearing may be cleaned to remove any lubricants and oils used in the forming and shaping process. Additionally, cleaning can prepare the exposed surface of the fluoropolymer composition for the application of the coating. Cleaning may include chemical cleaning with solvents and/or mechanical cleaning, such as ultrasonic cleaning.

Figure 2F:
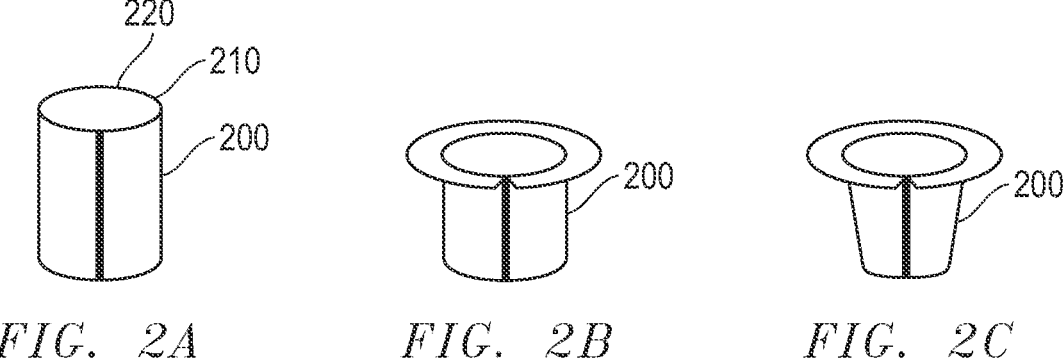
FIG. 2F illustrates an L type bearing made from the polymer composition that can be formed using a stamping and cold deep drawing process, rather than rolling and flanging.
Figure 2F:
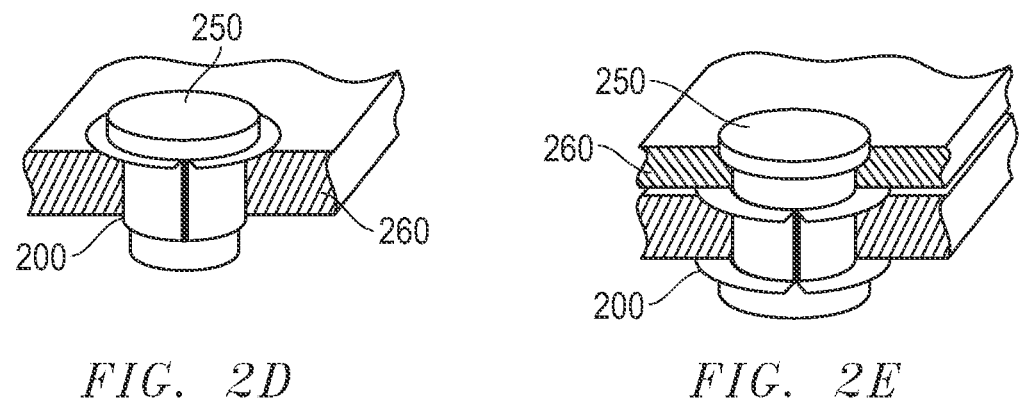
Figure 2F:
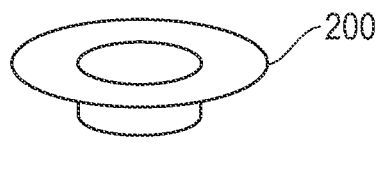

FIGS. 2A through 2F illustrate a number of exemplary bearing 200 shapes that can be formed from the polymer compositions described herein. FIG. 2A illustrates a cylindrical bearing 200 that can be formed by rolling. The bearing 200 may include a substrate 210 and the polymer composition 220 coated thereon. FIG. 2B illustrates a flanged bearing 200 that can be formed by rolling and flanging. FIG. 2C illustrates a flanged bearing 200 having a tapered cylindrical portion that can be formed by rolling a tapered portion and flanging an end. FIG. 2D illustrates a flanged bearing 300 mounted in a housing with a shaft pin mounted through the flanged bearing 300. FIG. 2E illustrates a two-sided flanged bearing 200 mounted in a housing with a shaft pin mounted through the two-sided flanged bearing 200. FIG. 2F illustrates an L type bearing 200 that can be formed using a stamping and cold deep drawing process, rather than rolling and flanging. As shown in FIGS. 2D and 2E, the bearing 200 may then be placed between a first component (e.g. a shaft) 250 and a second component (e.g. a housing) 260 and provide a mating surface for at least one of the neighboring parts in an assembly.

Figure 3:
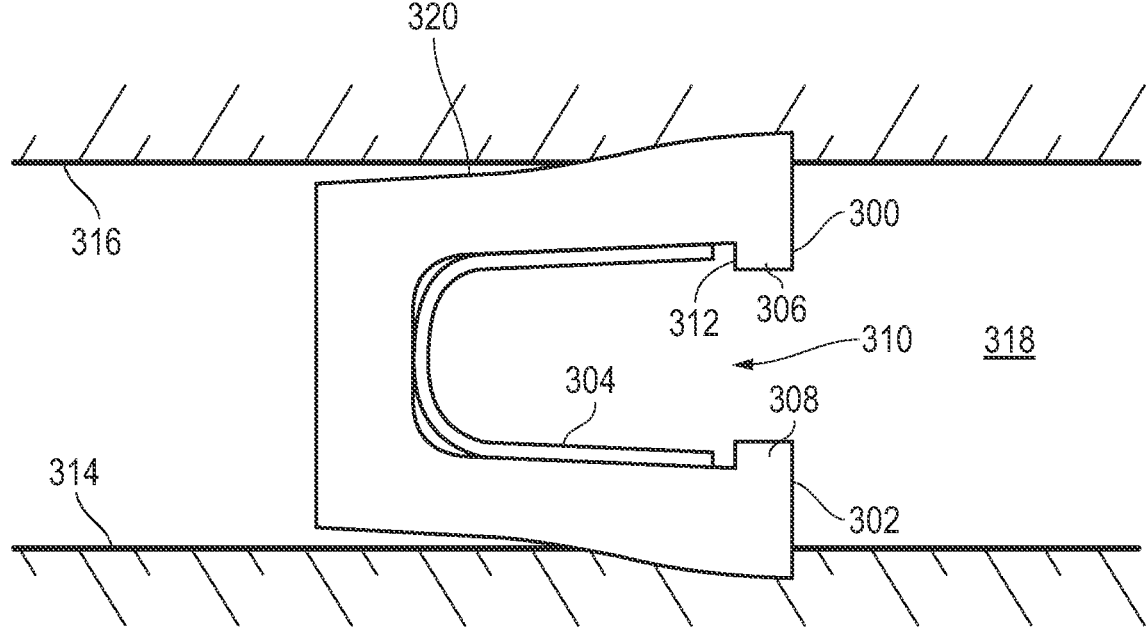
FIG. 3 includes a cross-sectional view of a seal made from the polymer composition in accordance with an embodiment.

In a number of embodiments, the polymer composition can be formed into a seal. The polymer composition may be formed into a seal in any way known in the sealing arts. The seal may be any seal known in the seal arts including an O-ring, a C-ring, a V-ring, a U-ring, or may be another type. The seal may include at least one energizer. FIG. 3 illustrates an exemplary seal that can be formed from the polymer compositions described herein. In a number of embodiments, the polymer composition may be made into one of the components of the seal mentioned herein. In a number of embodiments, the polymer composition may be applied as a coating onto one of the preformed components of the seal mentioned herein. Referring to FIG. 3, a seal 300 can generally include a jacket 302 (made from the polymer composition) and an energizing element 304. The jacket 302 may include fingers 306 and 308 defining a recess 310. In an embodiment, the fingers 306 and 308 may be symmetrical about a line 312 such that the recess 310 is also symmetrical. The energizing element 304 may be disposed within the recess 310, such as partially disposed in the recess 310 or entirely disposed in the recess 310. In an embodiment, at least one of the fingers 306 and 308 may include a distal flange 312 extending toward the recess 310. The distal flange 312 may prevent dislodgment of the energizing element 304 from the recess 310. In some embodiments, a seal 300 can be used in storage of fluids experiencing wide pressure cycles, such as hydrogen storage vessels experiencing a pressure change of 1 bar to 2,000 bars.

Applications for embodiments include, for example, assemblies for hinges and other vehicle components. Further, use of the polymer composition or assembly may provide increased benefits in several applications such as, but not limited to, door, hood, tailgate, and engine compartment hinges, seats, steering columns, flywheels, driveshaft assemblies, powertrain applications (such as belt tensioners), or other types of applications outside of vehicle components. These applications are examples, but are by no means limiting as polymer compositions according to embodiments herein are applied in a broad spectrum of commercial industry ranging from the heavy metal industry to the automotive and bike industry, even into baking industry, laptop/mobile phone hinges, bearings for solar applications and more. Further, polymer compositions according to embodiments herein may be used in any applicable application which uses polytetrafluoroethylene such as, but not limited to, pharmaceuticals, seals, medical devices, lubricants, coatings, electronics, composites, liners, kitchenware, lubricants, mechanics, polymer sciences, packaging, cyclic fluid storage applications, high temperature seals and gaskets for static or dynamic applications, or may be another use. According to particular embodiments herein, the polymer composition may surprisingly provide higher melting points while still exhibiting the unique mechanical strength, temperature resistance, low friction, and chemical inertness of unmodified polytetrafluorethylene. In addition, polymer compositions according to embodiments herein may provide ease of manufacturing, reduce complex componentry, and reduce assembly time, thereby increasing lifetime, improving visual appearance, and improving effectiveness and performance of the assembly, the polymer composition, and its other components. In addition, a higher melting temperature polytetrafluoroethylene polymer composition may be formed according to embodiments herein, which provides PTFE based polymers for higher temperature applications with increased thermal resistance. In addition, a higher melting temperature polytetrafluoroethylene polymer composition may be formed according to embodiments herein, which increases creep resistance and shows less dimensional changes over time.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1: A polymer composition comprising: a fluoropolymer composition comprising greater than 99 wt % polytetrafluoroethylene, wherein the fluoropolymer composition exhibits a melting temperature of greater than 327° C. at a pressure of 0.1 MPa.

Embodiment 2: A method comprising: providing a fluoropolymer composition comprising greater than 99 wt % polytetrafluoroethylene; heating the fluoropolymer composition to a range from 320° C. to 370° C. while pressurizing the fluoropolymer composition to a range from 60 MPa to 100 MPa; and annealing the fluoropolymer composition to range from 330° C. to 150° C. while pressurizing the fluoropolymer composition to a range from 100 MPa to 1 MPa at a rate of between 2° C. and 10° C./min to form a polymer composition exhibiting a melting temperature of greater than 327° C. at a pressure of 0.1 MPa.

Embodiment 3: The polymer composition or method of any of the preceding embodiments, wherein the polymer composition exhibits a crystallinity of greater than 95% in planar zig-zag crystal III in the phase diagram for polytetrafluoroethylene, such as greater than 97%, such as greater than 99%, or such as greater than 99.5%.

Embodiment 4: The polymer composition or method of any of the preceding embodiments, wherein the polymer composition exhibits a crystallinity of greater than 95%, such as greater than 97%, such as greater than 99%, or such as greater than 99.5%.

Embodiment 5: The polymer composition or method of any of the preceding embodiments, wherein the polymer composition consists of polytetrafluoroethylene powder.

Embodiment 6: The polymer composition or method of any of the preceding embodiments, wherein the polymer composition has a density of between 2.15 and 2.3 g/cc at ambient temperature and pressure.

Embodiment 7: The polymer composition or method of any of the preceding embodiments, wherein the polymer composition has an enthalpy of melting $\Delta H_m$ of between 30 and 70 J/g.

Embodiment 8: The polymer composition or method of any of the preceding embodiments, wherein the polymer composition has an enthalpy of crystallization $\Delta H_C$ of between 20 and 35 J/g.

Embodiment 9: The polymer composition or method of any of the preceding embodiments, wherein the polymer composition has a temperature of crystallization of between 300° C. and 325° C.

Embodiment 10: The polymer composition or method of any of the preceding embodiments, wherein the polymer composition comprises a filler.

Embodiment 11: The polymer composition or method of embodiment 10, wherein the filler comprises carbon black.

Embodiment 12: The polymer composition or method of embodiment 10, wherein the filler comprises an organic material.

Embodiment 13: The polymer composition or method of embodiment 10, wherein the filler comprises an inorganic material.

Embodiment 14: The polymer composition or method of embodiment 10, wherein the filler comprises a fluoropolymer.

Embodiment 15: The polymer composition or method of any of the preceding embodiments, wherein the polymer composition is formed into a seal.

Embodiment 16: The polymer composition or method of any of the preceding embodiments, wherein the polymer composition is formed into a bearing.

Embodiment 17: The method of embodiment 2, wherein the heating step is done in a molding operation.

Embodiment 18: The method of embodiment 2, wherein the polymer composition is applied as a coating on a substrate.

Note that not all of the features described above are required, that a region of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, however, the benefits, advantages, solutions to problems, and any feature(s) that may cause any benefit, advantage, or solution to occur or become more pronounced are not to be construed as a critical, required, or essential feature of any or all the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

The specification and illustrations of the embodiments described herein are intended to provide a general understanding of the structure of the various embodiments. The specification and illustrations are not intended to serve as an exhaustive and comprehensive description of all of the elements and features of assembly and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

EXAMPLES

Figure 4:
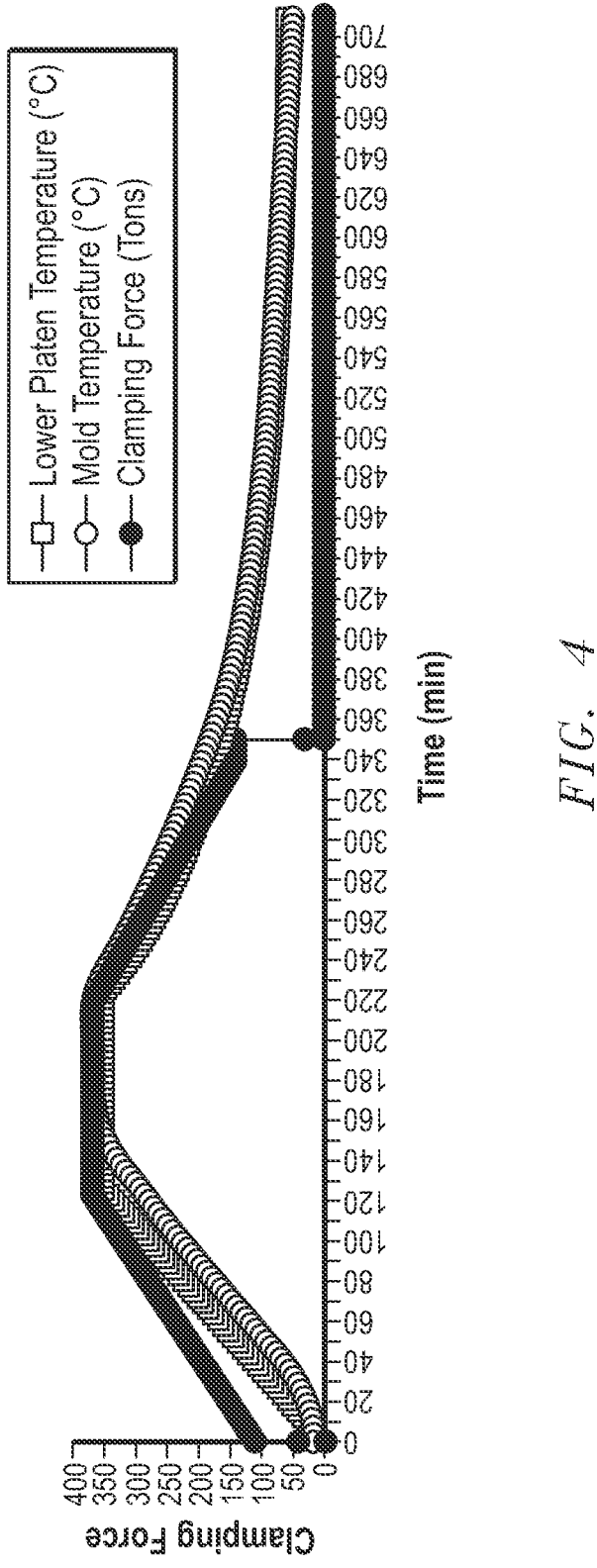
FIG. 4 illustrates a graph of a step of the forming process of an exemplary polymer composition.

Polymer compositions according to embodiments described herein were prepared according to experiments below. Specifically, a stock polymer powder including polytetrafluoroethylene as a fluoropolymer composition was provided. The fluoropolymer composition was heated to a range from 320° C. to 370° C. while pressurizing the fluoropolymer composition to a range from 60 MPa to 100 MPa. The heating step of the method may further include heating through a molding operation. The polymer composition may then be formed into parts through the molding operation. The molding operation can include injection molding. The fluoropolymer composition was then annealed to range from 330° C. to 150° C. while pressurizing the fluoropolymer composition to a range from 100 MPa to 1 MPa at a rate of between 2 and 10° C./min to form a polymer composition exhibiting a melting temperature of greater than 327° C. at a pressure of 0.1 MPa. FIG. 4 illustrates the annealing step of the method in detail with the upper plate temperature, the lower plate temperature, the mold, and the clamping force provided as a function of time according to embodiments herein. As shown, the annealing and pressurizing of the polymer composition show unexpected results of crystallization at this rate. Specifically, this rate may form the highest planar zig-zag crystal III crystal structure of PTFE, resulting in higher density and a higher melting point of the polymer composition.

As a result of this process, a polymer composition was prepared according to embodiments herein and compared against other samples in Table 1 below. Sample 1 was a polymer composition including a fluoropolymer composition including PTFE according to embodiments herein was prepared without sintering. Sample 2 was a polymer composition including a fluoropolymer composition including PTFE according to embodiments herein was prepared with sintering. Sample 3 was a polymer composition including a fluoropolymer composition including PTFE according to embodiments herein was prepared with sintering at 370° C. and 8.4 ksi. Sample 4 was a polymer composition including a fluoropolymer composition including PTFE according to embodiments herein was prepared with sintering at 380° C. and 10 ksi. Sample 5 was a polymer composition including a fluoropolymer composition including PTFE according to embodiments herein was prepared with sintering at 380° C. and 10 ksi. Sample 6 was a polymer composition including a fluoropolymer composition including PTFE according to embodiments herein was prepared with sintering at 380° C. and 10 ksi. Sample 7 was a polymer composition including a fluoropolymer composition including PTFE according to embodiments herein was prepared with sintering at 380° C. and 10 ksi. Sample 8 was a polymer composition including a fluoropolymer composition including PTFE according to embodiments herein was prepared with sintering at 380° C. and 10 ksi. Sample 9 was a polymer composition including a fluoropolymer composition including PTFE according to embodiments herein was prepared with sintering at 380° C. and 10 ksi. The results are shown in Table 1 below.

TABLE 1

| Sample | Density (g/cc) |
| --- | --- |
| 1 | 2.21 |
| 2 | 2.14 |
| 3 | 2.17 |
| 4 | 2.2 |
| 5 | 2.23 |
| 6 | 2.23 |
| 7 | 2.23 |
| 8 | 2.21 |
| 9 | 2.23 |

As shown in Table 1, when pressure is higher than 8,000 psi, as uniquely found through according to embodiments herein, one starts to see the formation of the zig-zag crystal III crystal structure (as indicated by the higher density), which results in a higher melting point of the polymer composition.

The temperature of melting, the enthalpy of melting, the temperature of cooling, and the enthalpy of cooling for samples 1, 2, 3, 4, and 7 are shown in Table 2 below.

TABLE 2

| Sample | $T_m^1$ (° C.) | $H_m^1$ (J/g) | $T_c^1$ (° C.) | $H_c^1$ (J/g) |
| --- | --- | --- | --- | --- |
| 1 | 346.6 +/− 0.8 | 57.6 +/− 1.3 | 314.2 +/− 0.5 | 30.3 +/− 1.9 |
| 2 | 331.9 +/− 0.6 | 31.1 +/− 1.2 | 312.9 +/− 0.6 | 40.8 +/− 1.3 |
| 3 | 330.4 +/− 0.2 | 31.4 +/− 0.1 | 313.5 +/− 0.5 | 35.1 +/− 0.6 |
| 4 | 344.6 +/− 8.2 | 48.2 +/− 15 | 312.8 +/− 0.3 | 31.0 +/− 0.4 |
| 7 | 348.9 +/− 0.3 | 69.9 +/− 1.9 | 313.8 +/− 0.1 | 25.7 +/− 0.2 |

As shown in Table 2, there is a significant increase in melting temperature and enthalpy of melting in the samples (2, 3, 4, and 7) of polymer compositions according to embodiments herein when compared to reference polymer compositions (sample 1).

The crystallinity, amorphous area, and crystallinity % for samples 1 and 4 are shown in Table 3 below.

TABLE 3

| Sample | Crystallinity (Area) | Amorphous (area) | Crystallinity (%) |
|--------|---------------------|------------------|-------------------|
| 1 | 100.8 | 49.7 | 67 |
| 1 | 107.3 | 53.5 | 67 |
| 1 | 120.1 | 55.4 | 68 |
| 4 | 247 | 5.8 | 98 |
| 4 | 268.5 | 7.1 | 97 |

As shown in Table 3, there is a significant increase in crystallinity % in the samples (4) of polymer compositions according to embodiments herein when compared to reference polymer compositions (sample 1).

What is claimed is:

1. A polymer composition comprising:

a fluoropolymer composition comprising greater than 99 wt % polytetrafluoroethylene, wherein the fluoropolymer composition exhibits a melting temperature of greater than 327° C. for the composition at a pressure of 0.1 MPa, and wherein the polymer composition exhibits a crystallinity of greater than 95% in planar zig-zag crystal III in a phase diagram for polytetrafluoroethylene.

2. A method for producing the composition of claim 1 comprising:

providing a fluoropolymer composition comprising greater than 99 wt % polytetrafluoroethylene;

heating the fluoropolymer composition to a range from 320° C. to 370° C. while pressurizing the fluoropolymer composition to a range from 60 MPa to 100 MPa; and annealing the fluoropolymer composition to range from 330° C. to 150° C. while pressurizing the fluoropolymer composition to a range from 100 MPa to 1 MPa at a rate of between 2° C. and 10° C./min to form a polymer composition exhibiting a melting temperature of greater than 327° C. at a pressure of 0.1 MPa.

3. The polymer composition of claim 1, wherein the polymer composition exhibits a crystallinity of greater than 95% in planar zig-zag crystal III in a phase diagram for polytetrafluoroethylene.

4. The polymer composition of claim 1, wherein the polymer composition exhibits a crystallinity of greater than 95%.

5. The polymer composition of claim 1, wherein the polymer composition consists of polytetrafluoroethylene powder.

6. The polymer composition of claim 1, wherein the polymer composition has a density of between 2.15 and 2.3 g/cc at ambient temperature and pressure.

7. The polymer composition of claim 1, wherein the polymer composition has an enthalpy of melting $\Delta H_m$ of between 30 and 70 J/g.

8. The polymer composition of claim 1, wherein the polymer composition has an enthalpy of crystallization $\Delta H_C$ of between 20 and 35 J/g.

9. The polymer composition of claim 1, wherein the polymer composition has a temperature of crystallization of between 300° C. and 325° C.

10. The polymer composition of claim 1, wherein the polymer composition comprises a filler.

11. The polymer composition of claim 10, wherein the filler comprises carbon black.

12. The polymer composition of claim 10, wherein the filler comprises an organic material.

13. The polymer composition of claim 10, wherein the filler comprises an inorganic material.

14. The polymer composition of claim 10, wherein the filler comprises a fluoropolymer.

15. The polymer composition of claim 1, wherein the polymer composition is formed into a seal.

16. The polymer composition of claim 1, wherein the polymer composition is formed into a bearing.

17. The method of claim 2, wherein the heating step is done in a molding operation.

18. The method of claim 2, wherein the polymer composition is applied as a coating on a substrate.

19. The method of claim 2, further comprising sintering the polymer composition at 380° C. and 10 ksi.

* * * * *